United States Patent [19]

Bjork et al.

[11] 3,844,603

[45] Oct. 29, 1974

[54] BOOT FOR CAMPER-TRUCK COMBINATION

[76] Inventors: Robert M. Bjork; Steven Robert Bjork, both of 1901 Topeka Dr., Northridge, Calif. 91324

[22] Filed: July 23, 1973

[21] Appl. No.: 381,692

[52] U.S. Cl............................. 296/23 MC, 52/393
[51] Int. Cl.............................................. B60p 3/32
[58] Field of Search ..... 296/23 MC, 23 R; 280/403; 52/208, 397, 213, 393, 400; 285/189, 201, DIG. 18, 222; 49/483

[56] References Cited
UNITED STATES PATENTS

| | | | |
|---|---|---|---|
| 1,796,837 | 3/1931 | Fisher | 49/483 |
| 3,221,456 | 12/1965 | Capel | 52/208 |
| 3,625,560 | 12/1971 | Bjork | 296/23 MC |

Primary Examiner—Robert B. Reeves
Assistant Examiner—H. Grant Skaggs, Jr.
Attorney, Agent, or Firm—Jessup & Beecher

[57] ABSTRACT

A boot is provided for intercoupling the rear window aperture of a truck cab with the front facing window aperture of a camper carried by the truck, after the pane of glass in the cab window aperture has been removed, so as to afford communication between the truck and the camper. The boot of the invention includes a metallic frame contoured to the shape of the rear window aperture of the cab, to be held in the aperture by the rubber gasket which previously held the original pane of glass in the aperture. The boot also includes a flexible plastic tubular member formed, for example, of vinyl plastic, and which is adhesively attached to the metallic frame.

4 Claims, 4 Drawing Figures

PATENTED OCT 29 1974  3,844,603

BOOT FOR CAMPER-TRUCK COMBINATION

BACKGROUND OF THE INVENTION

The boot assembly of the present invention is of the same general type as described in U.S. Pat. No. 3,625,560 which issued Dec. 7, 1971 to the present inventor. As described in the patent, it is most desirable to provide a connecting passage between the cab and camper in the usual truck/camper combination, and this is usually achieved by removing the rear window pane from the cab of the truck and by removing the facing front window pane from the forward wall of the camper, and by then intercoupling the two window apertures by means of an open ended flexible boot. The boot extends between the truck and the camper into the window apertures so as to define a communication passage between the cab and camper.

As also described in the patent, most prior art boot assemblies of the type under consideration are relatively expensive, difficult to install, and have a tendency to leak and admit dust. The assembly described in the patent, on the other hand, is water-tight and dust-tight, and it may be easily and readily mounted in place in the truck window aperture, without the need for tools of any kind and without disfiguring the truck body in any way. The boot assembly described in the patent may be easily removed from the truck window whenever the camper is to be taken off the truck.

The boot assembly of the present invention is of the same general type as that described in the patent, and has the same features and advantages. As mentioned above, the particular boot with which the present invention is concerned includes a metallic frame which is shaped to fit into the rear window aperture of the truck cab. In order to install the boot of the invention, it is merely necessary to remove the rear window from the cab, and to use the rubber gasket which previously held the window in place as a rim for the metallic frame, so that the metallic frame may be conveniently inserted into place in the cab window aperture, without the need for tools or holes.

The vinyl plastic casing of the boot assembly of the invention is adhesively attached to the metal frame, as mentioned above, and the boot assembly is coupled securely to the rim of the cab window aperture in a water-tight, air-tight and dust-tight joint, and yet it can be easily removed. Moreover, the mounting of the boot assembly in the cab window aperture does not require holes, or any other disfigurement in the cab body.

DETAILED DESCRIPTION OF THE ILLUSTRATED EMBODIMENT

Figure 1:
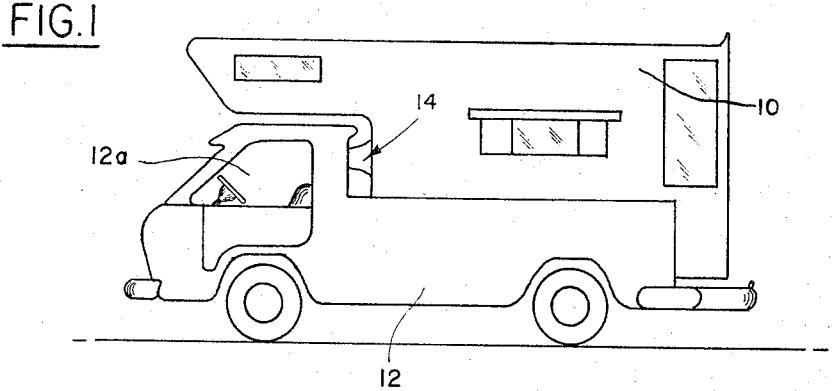
FIG. 1 is a side elevation of a truck and camper combination showing a boot assembly extending between the forward end of the camper and the rear wall of the truck cab, and which may be constructed in accordance with the concepts of the present invention.
Figure 2:
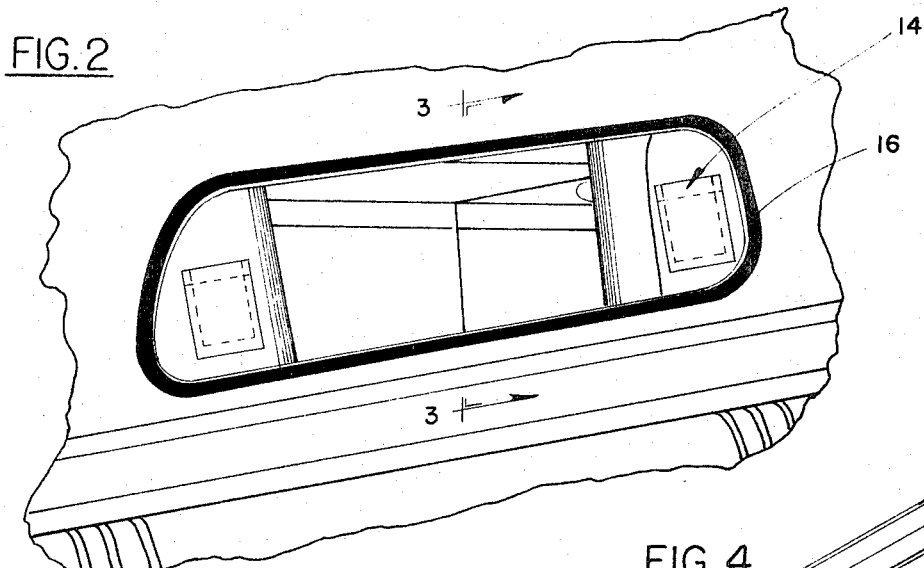
FIG. 2 is an internal view of the boot assembly of FIG. 1, looking back into the camper from the rear of the truck cab.
Figure 3:
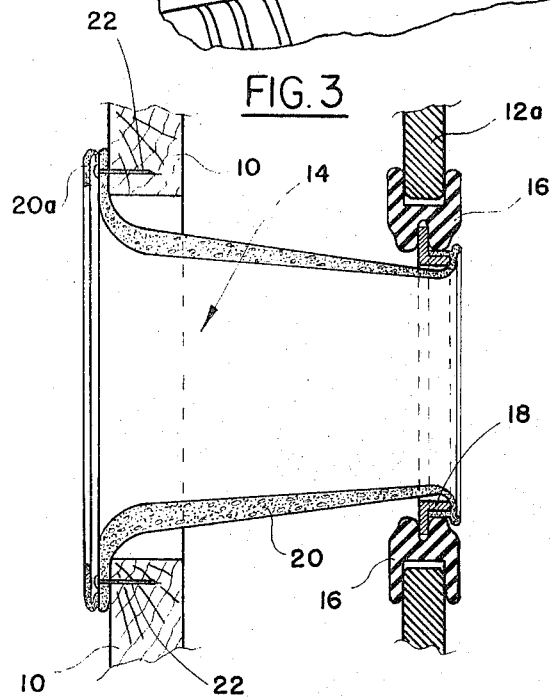
FIG. 3 is a cross-sectional view of the boot assembly taken essentially along the line 3—3 of FIG. 2.
Figure 4:
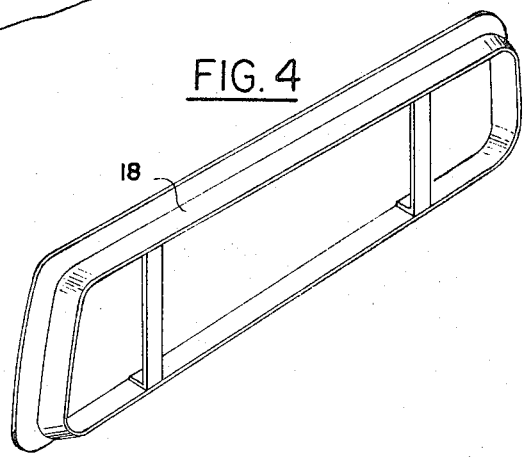
FIG. 4 is a perspective representation of a metallic frame which forms a component of the boot assembly, and which may be easily and simply mounted within the rear window aperture of the cab.

The truck/camper assembly shown in FIG. 1 includes a usual type of camper 10 which is mounted on the back of a truck 12. The truck 12 has a cab 12a. In order to provide a communicating channel between the cab 12a and the interior of the camper 10, a boot assembly 14 extends between the rear wall of the cab and the forward wall of the camper. The boot assembly is in the form of an enclosed passageway, one end of which extends into the window aperture in the rear of the truck cab and the other end of which extends into the window aperture in the forward wall of the camper.

The boot 14 of the invention is intended to be used in conjunction with a truck cab window of the type in which a single pane of glass is held within an elongated window aperture by means of a rubber gasket 16. To mount the forward end of the boot in the window aperture in the rear wall of the cab 12a, the window and gasket 16 are removed from the window aperture in the rear wall of the cab. The gasket 16 is then fitted around a metallic frame 18, the frame being contoured to the shape of the rear window aperture of the cab 12a. The gasket 16 serves to hold the frame 18 in place in the truck cab window aperture.

The boot assembly 14 of the invention includes a tubular casing 20 which may be formed, for example, of two layers of vinyl plastic, or the like. The two plastic layers are sewn together, and have a layer of foam plastic interposed therebetween. The forward end of the casing 20 is adhesively attached to the frame 18. As mentioned above, the frame 18 may be composed of aluminum.

The other end of the boot assembly 14 may be secured to the inner rim around the window aperture of the camper 10 by any appropriate means, such as by staples 22 which extend into the wooden wall of the camper. A flap 20a is sewn around the inner rim of the casing 20 to cover the heads of the staples.

The forward end of the boot assembly 14 may be removed easily and simply from the rear window aperture of the cab 12a without the need of any tools, whenever the camper 10 is to be removed from the truck. Also, and as described above, the forward end of the boot may just as easily be installed in the rear window aperture of the cab, merely by removing the rear window pane, and replacing it with the frame 18, as described.

The invention provides, therefore, an improved boot assembly for use in conjunction with a truck and camper combination, and one which may be readily inserted into the rear window aperture of the cab, without the need for tools, or for mounting holes in the cab body, and which may be easily removed from the cab, whenever desired. When the boot assembly of the invention is mounted in place, it provides a dust-tight, water-tight, and air-tight seal, thereby isolating the interior of the cab and camper from the outside elements.

While a particular embodiment of the invention has been shown and described, modifications may be made. It is intended in the following claims to cover modifications which fall within the spirit and scope of the invention.

What is claimed:

1. A boot assembly intercoupling the forward end of a camper to the rear end of a truck cab, and extending into a window aperture in the rear wall of the cab and into a window aperture in the forward wall of the camper, said boot assembly comprising; a tubular casing formed of flexible material and having a first open end and a second open end; a rigid metallic frame contoured to the shape of the window aperture in the rear wall of the cab and having an L-shaped cross-section to define a first lip portion in the plane of the window aperture and a second lip portion perpendicular to said plane, said frame being positioned in the first open end of said casing member, with the material of said casing member extending around said second lip portion of said frame and adhesively bonded thereto; and a resilient gasket extending around the perimeter of said frame and having a slot therein receiving said first lip portion of said frame, said gasket serving to mount said frame in the window aperture in the rear wall of the cab.

2. The boot assembly defined in claim 1, in which said flexible tubular member is composed of vinyl plastic.

3. The boot assembly defined in claim 2, in which said frame is composed of aluminum.

4. The boot assembly defined in claim 1, in which the second open end of said flexible tubular member extends into the window aperture in the forward wall of said camper, and which includes a plurality of staples attaching said second end to the wall of said camper, and a flap formed around said second open end of said tubular member and providing a cover for the heads of the staples.

* * * * *